United States Patent
Kotnis et al.

(10) Patent No.: US 8,182,876 B2
(45) Date of Patent: May 22, 2012

(54) SEAMLESS MODEL AND METHOD OF MAKING A SEAMLESS MODEL

(75) Inventors: Mahesh Kotnis, Okemos, MI (US); Elizabeth Louise Otloski, Haslett, MI (US); Paul Terrence Wombwell, Herts (GB); William Walter Charles Badcock, Littlebury (GB); Richard Martin Broad, Great Eversden (GB)

(73) Assignee: Huntsman Advanced Materials Americas LLC, The Woodlands, TX (US)

( * ) Notice: Subject to any disclaimer, the term of this patent is extended or adjusted under 35 U.S.C. 154(b) by 962 days.

(21) Appl. No.: 10/380,392

(22) PCT Filed: Sep. 4, 2001

(86) PCT No.: PCT/EP01/10199
§ 371 (c)(1),
(2), (4) Date: Jul. 10, 2003

(87) PCT Pub. No.: WO02/20261
PCT Pub. Date: Mar. 14, 2002

(65) Prior Publication Data
US 2004/0013865 A1    Jan. 22, 2004

(51) Int. Cl.
*B05D 3/02* (2006.01)
*B29C 59/00* (2006.01)
*B29C 41/00* (2006.01)
*B28B 11/18* (2006.01)
*D21H 19/62* (2006.01)

(52) U.S. Cl. ............ 427/385.5; 427/386; 264/129; 264/162; 264/299; 106/287.22

(58) Field of Classification Search ............ 427/385.5, 427/386; 264/129, 162, 299; 106/287.22
See application file for complete search history.

(56) References Cited

U.S. PATENT DOCUMENTS 4,546,118 A * 10/1985 Simpson et al. ............ 521/130
4,916,173 A *  4/1990 Otloski et al. ............ 523/219
(Continued)

OTHER PUBLICATIONS

Marlin et al., "Mechanically Frothed Urethane: A New Process for Controlled Gauge, High Density Foam." Journal of Cellular Plastics, vol. 11, No. 6, Nov./Dec. 1975, pp. 317-322.

*Primary Examiner* — Timothy Meeks
*Assistant Examiner* — Cachet Sellman

(57) ABSTRACT

The invention relates to a seamless model free of bond lines and to a method of making same. The method includes the sequential steps of providing a substructure having an exposed outer surface, applying a modeling paste to the outer surface of the substructure in the form of a continuous layer, curing the continuous layer of applied modeling paste, and machining said cured layer of modeling paste to the desired contour. The modeling paste of the invention is a mechanically frothed syntactic foam prepared by injecting inert gas with mechanical stirring into either a formed froth-forming composition, which is preferably a polyurethane or epoxy froth-forming composition containing microballoons. The polyurethane composition exemplified herein comprises (1) an organic polyisocyanate component; (2) a polyol component comprising (a) greater than 50%, by weight of a high molecular weight polyol and (b) less than 50%, by weight, of a low molecular weight polyol; and (3) a chemical thixotropic agent in an amount sufficient to induce thixotropic properties. The epoxy composition preferably comprises (1) an epoxy resin; (2) a thixotropic agent in an amount sufficient to induce thixotropic properties; and (3) a hardener comprising (a) at least one polyethyleneimine and (b) at least one other amine having at least two amino hydrogen groups, the combined amounts of (a) and (b) being sufficient to effect cure of the epoxy resin.

31 Claims, 1 Drawing Sheet

U.S. PATENT DOCUMENTS

| | | | |
|---|---|---|---|
| 5,128,433 A * | 7/1992 | LeCompte et al. | 528/60 |
| 5,401,785 A * | 3/1995 | Kumagai et al. | 521/112 |
| 5,707,477 A | 1/1998 | Cloud | |
| 5,773,047 A | 6/1998 | Cloud | |
| 6,060,540 A * | 5/2000 | Wanthal et al. | 523/444 |
| 6,077,886 A * | 6/2000 | Hayes et al. | 523/466 |
| 2002/0052425 A1 * | 5/2002 | Kaku et al. | 521/137 |

* cited by examiner

SEAMLESS MODEL AND METHOD OF MAKING A SEAMLESS MODEL

BACKGROUND OF THE INVENTION

In the transport industries (for example, the automotive, rail and aerospace industries), it is common practice to produce large, dimensionally accurate master models. These models are used by engineers for conceptual design of the individual component parts of the final product.

The state-of-the-art often involves a "building block" approach wherein multiple boards are glued together to produce a rough model structure and then are machined to form the desired shape (illustrated in FIG. 1). This approach, however, is labor intensive and requires precision operations, leading to high cost, and moreover results in a model having bondlines at the surface, an appearance which is aesthetically undesirable.

There is thus a need in the industry for a model and method of making a model that is characterized by low cost and a smooth seamless surface free of bondlines. U.S. Pat. Nos. 5,707,477 and 5,773,047 describe a method for making prepreg parts for use in the aerospace industry where pliable solid paddies prepared from syntactic epoxy material are hand-applied to a block made by stacking successive layers of aluminum honeycomb core, which entire resulting structure is heat cured to effect cure of the paddies. However, this approach is labor intensive in that it involves hand application of the pliable solid paddies to the honeycomb core as well as requiring heating of the entire structure in order to cure the applied paddies. The resulting models are also of relatively high density.

There thus remains continued need in the art for a model and method of producing same where the model is characterized by lower production cost, lower weight and a more uniform surface having improved smoothness and free of bondlines.

SUMMARY OF THE INVENTION

The present invention is directed to a model and a method of making a model which meets these needs of industry. The method of making a seamless model free of bond lines in accordance with the present invention includes the sequential steps of providing a substructure having an exposed outer surface, applying a modeling paste to the outer surface of the substructure in the form of a continuous layer, curing the continuous layer of applied modeling paste, and machining said cured layer of modeling paste to the desired contour. This method is termed herein as "net size casting" using a "seamless modeling paste" (SMP).

The modeling paste of the invention is a mechanically frothed syntactic foam prepared by injecting inert gas with mechanical stirring into a resin composition, which is preferably a low temperature curable thermoset. Most preferably, the composition is either a formed polyurethane or epoxy froth-forming composition containing microballoons. The polyurethane composition exemplified herein comprises (1) an organic polyisocyanate component; (2) a polyol component comprising (a) greater than 50%, by weight of a high molecular weight polyol and (b) less than 50%, by weight, of a low molecular weight polyol; and (3) a chemical thixotropic agent in an amount sufficient to induce thixotropic properties. The preferred epoxy composition comprises (1) an epoxy resin; (2) a thixotropic agent in an amount sufficient to induce thixotropic properties; and (3) a hardener comprising (a) at least one polyethyleneimine and (b) at least one other amine having at least two amino hydrogen groups, the combined amounts of (a) and (b) being sufficient to effect cure of the epoxy resin.

DETAILED DESCRIPTION OF THE INVENTION

The undersized support structures used in accordance with the present invention, and methods of making said structures, are known in the art and may be of the same type of structure typically produced as a back support for conventional board models. Said structure is used as a core onto which the modeling paste is applied. Examples of materials from which the support structure is made include, but are not limited to, natural wood and low-density foams made for example from polystyrene, polyurethane or epoxy materials. One example of such low-density core is Dow HD 3000, a 0.03 density expanded polystyrene.

Figure 1:
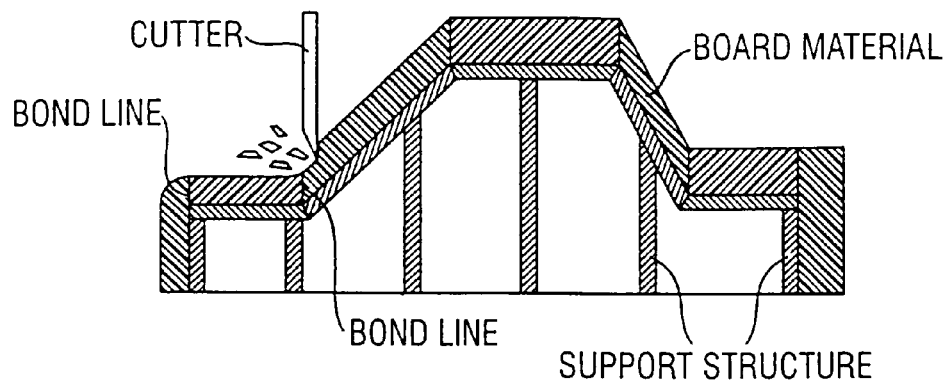
FIG. 1 illustrates an example of the prior art "building block" modeling method by gluing multiple boards.
Figure 2:
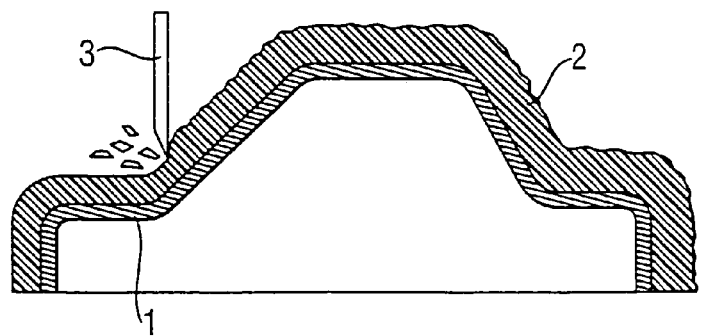
FIG. 2 illustrates a cross-section of a seamless model free of bond lines produced in accordance with the present invention.

Referring to FIG. 2, a layer of modeling paste 2 is applied to the outer surface of the substructure 1. Preferably, the layer of modeling paste is dispensed onto the substructure surface with a high-output meter-mix machine in the form of a continuous layer. The paste is preferably applied at a thickness of from about 0.5 to about 1.5 inch thick, more preferably at about 0.75 inch thick. The paste is then cured.

Cure of the curable resin composition can be effected in accordance with conventional practice in the particular application. In general, the composition can be allowed to gel (set) at ambient temperature or heated moderately in accordance with conventional practice to accelerate setting. Subsequently, completion of cure may be effected at ambient temperature, moderately elevated temperature or higher temperature as required. Typically, room temperature cure is preferred.

After curing, the resin layer is machined to the final contour by use of a cutter 3. Typically, approximately 0.25 inch of material is removed during machining. The surfaces may be sealed with a sealant before the model is put into production.

The seamless master modeling paste which is dispensed onto the outer surface of the substructure is comprised of a mechanically frothed syntactic foam. The foam is prepared by injecting inert gas with mechanical stirring into a formed froth-forming composition comprising the curable resin composition, microballons and any other optional additives.

The mechanically frothed syntactic foam used in accordance with the present invention is required to exhibit good non-slump and sag resistance properties when laid horizontally oriented on a vertical surface. Typically, a minimum sag resistance of a one inch thickness on a vertical surface is required. It has been found that mechanically frothed syntactic foams made from certain polyurethane, epoxy and polyester froth-forming mixtures particularly meet these criteria.

Examples of suitable curable polyurethane froth-forming mixtures include, but are not limited to, those comprising (1) an organic polyisocyanate component; (2) a polyol component comprising (a) greater than 50%, by weight, of a high molecular weight polyol and (b) less than 50%, by weight, of a low molecular weight polyol; and (3) a chemical thixotropic agent in an amount sufficient to induce thixotropic properties. Preferably, the low molecular weight polyol (b) is present in an amount of less than 40%, by weight, based on the total weight of the combined polyol component. The polyisocyanate and polyol components are conveniently liquid under ambient temperature and pressure conditions, with the polyisocyanate component having a viscosity in the range of 500-3000 cps and the polyol component having a viscosity of less than 30,000 cps in order to ensure optimal throughput in the mixing and dispensing apparatus. However, both components may have greater viscosity, for example up to 60,000 cps, if proper metering pumps are employed.

Suitable organic polyisocyanates (1) which are useful in the invention include any of those commonly employed in making polyurethane plastics including polyarylisocyanates such as polymethylene polyphenyl isocyanate, 4,4'-diphenylmethane diisocyanate and modifications thereof, for example, containing carbodiimide linkages, toluene diisocyanate, phenylindane diisocyanate, aliphatic polyisocyanates such as hexamethylene diisocyanate, isophorone diisocyanate, 2,2,4-trimethylhexamethylene diisocyanate, and blends thereof. Polymeric 4,4'-diphenylmethane diisocyanate is preferred.

Suitable high molecular weight polyols (2a) include those having hydroxyl numbers of less than 300, preferably between 100 and 300. Particularly suitable are polyether triols, including aliphatic alkylene glycol polymers having an alkylene unit composed of at least two carbon atoms. Typical ones are prepared through the polymerization of such alkylene oxides as ethylene oxide, propylene oxide, butylene oxide and tetrahydrofuran, and di- and polyfunctional alcohols such as water, propylene glycol, glycerol, trimethylol propane, hexanetriol, pentaerythritol and sucrose. Applicable materials will generally have molecular weights ranging from 500-7000 preferably between 500 and 1700. A typical polyether triol is available from Olin Corp., under the name POLY-O 30-280.

The low molecular weight polyols (2b) include those having hydroxyl numbers of at least 300, preferably between 300 and 1000, and more preferably between 350 and 800. Particularly suitable are amine-based polyols generally have an equivalent weight of from 30 to 6000 and a viscosity of from 1.0 to 20,000 centipoises at 25 to 60° C. Preferred are those having a molecular weight of between 50 and 400, more preferably, between 200 and 350. A wide variety of aromatic and aliphatic polyamines may form part of the amine-based polyols, such as di- and polyamines including ethylenediamine, triethanolamine and toluenediamine, to be reacted with, for example, the alkylene oxides, noted above. Amine-based triols are preferred. Typical amine-based polyols are available from Texaco Corp., under the designation THANOL SF 265 and from BASF Corp. under the designation PLURACOL 355.

The chemical thixotropic agent (3) imparts chemical thixotropy to the mixture of components (1) and (2) such that sufficient sag resistance is achieved during application of the final paste to the support structure, which is believed to be caused by the formation of adducts from the fast chemical reaction between the isocyanate and amine groups. It is important that chemical thixotropy is induced after mixing, foaming and dispensing onto the substructure as premature chemical thixotropy could lead to gelation in the mixing head. Typical examples of such chemical thixotropic agents are aliphatic, cycloaliphatic, aromatic, araliphatic and heterocyclic amines, including, but not limited to, 4,4'-methylenedianiline, m-phenylenediamine, 4,4'-methylenebis(2-ethylbenzeneamine), isophoronediamine and most particularly diethyltoluenediamine. The amount of thixotropic agent required to induce thixotropic properties may depend on the nature of the specific polyurethane and the specific thixotropic agent used. The amount is generally from 1 to 10%, preferably from 2 to 6%, by weight based on the weight of the polyisocyanate (1).

The polyurethane systems are prepared by admixing the polyisocyanate with the polyols. The microballoons and any other optional additives are generally included with the polyols. Generally stoichiometric amounts of polyisocyanate and polyol are utilized, with the possibility of deviating from the stoichiometric amount by utilizing up to about 2% excess polyol.

In order to meet the overall requirements for an acceptable cured polyurethane foamed modeling stock, the cured composition should have a heat deflection temperature (HDT) over 40° C., and preferably over 50° C., and a coefficient of thermal expansion (CTE) of less than $80 \times 10^{-6}$ in/in/° C. in the −30 to 30° C. range and preferably less than $60 \times 10^{-6}$ in/in/° C. Cured epoxy foamed modeling stock should also meet these criteria.

Also particularly suitable for use in the mechanically frothed syntactic foams are curable epoxy resin/hardener mixtures, as described, for example, in U.S. Pat. No. 6,077,886, issue date of Jun. 20, 2000, incorporated herein by reference, which comprise (1) an epoxy resin, (2) a thixotropic agent in an amount sufficient to induce thixotropic properties, and (3) a hardener comprising (a) at least one polyethyleneimine and (b) at least one other amine having at least two amino hydrogen groups, the combined amounts of (3)(a) and (3)(b) being sufficient to effect cure of the epoxy resin.

The epoxy resin (1) may consist of one or more epoxy resins which are themselves liquid or may be a liquid mixture of one or more solid epoxy resins with one or more liquid epoxy resins or may be one or more solid epoxy resins dissolved in a diluent such as a diluent conventionally used in epoxy resin compositions. The epoxy resin may be a polyglycidyl ether of a polyhydric alcohol such as 1,4-butanediol or 1,3-propanediol or, preferably, a polyglycidyl ether of a polyhydric phenol, for example a bisphenol such as bis(4-hydroxyphenyl)methane (bisphenol F) or 2,2-bis-(4-hydroxyphenyl)propane (bisphenol A) or a novolak formed from formaldehyde and a phenol such as phenol itself or a cresol, or a mixture of two or more such polyglycidyl ethers. Polyglycidyl ethers of bisphenol A are especially preferred. The epoxy resin, particularly where it comprises a solid epoxy resin, may contain one or more epoxy-functional diluents, usually monoepoxides, or non-epoxide diluents, such as the monoepoxide and non-epoxide diluents conventionally used in curable epoxy resin compositions.

The thixotropic agent (2) is preferably a thixotropic agent which, it is believed, relies largely on interparticle hydrogen bonding to achieve its thixotropic effect, especially a hydrophilic fumed silica. The amount of thixotropic agent required to induce thixotropic properties may depend on the nature of the specific epoxy resin and specific thixotropic agent used. This amount is generally from 1 to 20%, preferably from 3 to 15%, by weight based on the weight of the epoxy resin (1).

The polyethyleneimine (3)(a) may have a molecular weight (Mw) from 700 to 1,000,000 or more, preferably from 5000 to 750,000, especially from 25,000 to 750,000, particularly about 750,000. Such polyethyleneimines are commercially available or may be prepared from ethyleneimine by known procedures.

The amount of polyethyleneimine is generally chosen so that the epoxy resin composition of the invention does not flow during a desired time after the formation of the composition. Preferably, the amount of potyethyleneimine is such that the epoxy resin composition does not flow for at least 60 minutes after formation thereof. In certain specific embodiments of the invention, the amount of polyethyleneimine is such that the epoxy resin composition does not flow prior to gelation thereof, which in some instances requires several hours. The amount of polyethyleneimine needed to impart non-flow properties for a given time can be readily determined by simple experiment. For compositions of the invention containing the especially preferred components (1), (2) and (3)(b) described herein, an amount of polyethyleneimine from 0.2 to 2 parts by weight per 100 parts by weight of the epoxy resin is preferred.

As examples of amines suitable for use as the amine hardener (3)(b) there may be mentioned those aliphatic, cycloaliphatic, aromatic, araliphatic and heterocyclic amines known as hardeners for epoxy resins, including: alkylenediamines such as ethylenediamine or butane-1,4-diamine; polyalkylenepolyamines such as diethylenetriamine, triethylenetetramine, tetraethylenepentamine, dipropylenetriamine or tripropylenetetramine; N-hydroxyalkyl derivatives of polyalkylene polyamines such as N-(hydroxyethyl) diethylenetriamine or mono-N-2-hydroxypropyl derivative of triethylenetetramine; polyoxyalkylenepolyamines such as polyoxyethylene—and polyoxypropylene—diamines and triamines; N,N-dialkylalkylenediamines such as N,N-dimethylpropane-1,3-diamine or N, N-diethylpropane-1,3-diamine; cydoaliphatic amines having an amino or aminoalkyl group attached to the ring, such as 3-aminomethyl-3,5,5-trimethylcyclohexylamine (isophoronediamine); aromatic amines such as bis(4-aminophenyl)methane or bis(4-aminophenyl)sulphone; amine-terminated adducts of epoxy resins with aliphatic, cycloaliphatic or araliphatic amines as hereinbefore described; N-aminoalkyl-piperazines such as N-(2-aminoethyl)piperazine or N-(3-aminopropyl)piperazine; and polyaminoamides, for example reaction products of polyalkylenepolyamines such as those hereinbefore mentioned with polymerised unsaturated fatty acids, e.g. polymerised vegetable oil acids such as dimerised or trimerised linoleic or ricinoleic acids; or a mixture of two or more of such amines.

Aliphatic and cycloaliphatic amine hardeners are usually preferred for use as component (3)(b) of the composition, including N-hydroxyalkyl derivatives of polyalkylene polyamines, particularly a mono-N-2-hydroxypropyl derivative of triethylenetetramine, and mixtures thereof with polyaminoamide reaction products of polyalkylenepolyamines and polymerised vegetable oil acids and the amine functional reaction products of amines and epoxy group containing compounds. The amount of (3)(b) is preferably such that (3)(a) and (3)(b) together provide from about 0.75 to 1.25 amino hydrogen equivalents per 1,2-epoxide equivalent of the epoxy resin (1).

The epoxy resin composition may be formed conveniently by stirring a preformed mixture of (1) and (2) together with a preformed mixture of (3)(a) and (3)(b). The thixotropic agent may also be conveniently present in the hardener mixture.

The mechanically frothed syntactic foam used in accordance with the present invention may also be made from a polyester froth-forming mixture. Polyesters and formation thereof are well known in the art. The same general procedure followed for forming the polyurethane and epoxy froth forming mixture applies for polyesters as well, incorporating an agent to induce chemical thixotropic properties for achieving sufficient sag resistance.

The seamless master modeling paste prepared in accordance with the present invention contains a relatively uniform distribution of microballoons or hollow microspheres. Hollow microspheres are usually hollow thermoplastic spheres composed of acrylic type resins such as polyacrylonitrile and polymethylmethacrylate, acrylic modified styrene, polyvinylidene chloride, copolymers of styrene and methyl methacylate, and the like; thermosetting resins such as phenolic resins, epoxy resins, urea resins and the like; or hollow glass, silica, ceramic or carbon spheres that are very light in weight and act as a lightweight filler in the syntactic foam. Thermoplastic microballoons are preferred. Illustrative examples of suitable microballoons include, but are not limited to, Expancel, available from Akzo Nobel Corporation; Phenolic microballoons, available from CQ Technology Corporation; and Matsumoto microspheres available from Yusht-Seiyaku Company. These microballoons preferably have a diameter of about 5 to about 250 micrometers. The microballoons, or hollow microspheres, suitable for use in the invention are conventional in the art and methods for production of these microballoons are well known. Such microballoons are readily available commercially. These microballoons can be compressed somewhat when subjected to external pressure. However, they are relatively fragile and will collapse or fracture at high pressures. Therefore, there is a pressure range under which the microballoons can effectively operate. The microballoons facilitate machining, lead to reduced density and reduce the coefficient of thermal expansion. The surface of the microballoons may be treated suitably for better compatibility with the resin composition.

The microballoons are used in an amount sufficient to produce products of uniform density, but not too much as to produce difficulty in mixing such that nonhomogeneous products are produced. Suitable amounts are about 0.5 part to about 5 parts, based on 100 parts of the resin, preferably about 1 part to about 3 parts, per 100 parts of resin. The microballoons may be conveniently added with the hardener component, or they may be added with the resin component.

The formed froth-forming composition of the invention may also contain minor amounts of accelerators and additives conventionally used in the particular application, such as diluents, fillers (such calcium carbonate), fibers, pigments, dyes, fire retardants, antifoaming agents, wetting agents and polymeric toughening agents. Of particular interest is the addition of molecular sieves, which function as moisture scavengers, and are well known to those skilled in the art, being zeolites with open-network structures. Also of particular interest is the addition of surfactants or antifoaming agents such as a silicone surfactant like Dabco DC 197 Surfactant, available from Air Products, with others being well commercially available and well known to those skilled in the art. It has also been found that the addition of calcium stearate improves the machinability of the cured material and thus addition thereof is advantageous. These auxiliary materials may be conveniently added with the hardener component, or they may be added with the resin component.

Techniques for producing mechanically frothed syntactic foams are known in the art. For example, the article "Mechanically Frothed Urethane: A New Process for Controlled Gauge, High Density Foam", by Marlin et al., *Journal of Cellular Plastics*, November/December, 1975, describes such techniques. For example, mechanically frothed polyurethane foams are prepared by mechanical incorporation of an inert gas such as air into the isocyanate and polyol mixture, followed by polymerization to form the polyurethane foam. This is unlike the conventional polyurethane foam where foaming and polymerization occur simultaneously. A surfactant is employed in the formulation in order to permit the generation of froth, and the urethane polymerization is delayed through the expansion step and takes place after the froth has been applied to the substrate. The amount of air in the froth determines the density and consistency. The basic equipment is simple wherein the froth is generated continuously in a mixer equipped with blades to generate shear for dispersing the inert gas in the liquid mixture of isocyanate and polyols. The polyol component, which contains surfactant, additive(s) and filler(s) is metered as one stream. The isocyanate is metered as a separate stream, and inert gas is metered through a third inlet to achieve a given density. Machines for processing the foams are commercially available and are known in the field. Mechanically frothed epoxy and polyesters foams are prepared in a similar manner.

Inert gases which are suitable for use in accordance with the invention include those that are gaseous at room temperature and preferably not liquefied at −30° C., and further that are not reactive with the resin and hardener components. They include, for example, air, nitrogen gas, carbon dioxide gas and the like.

Dispersing of inert gas is carried out by mechanical frothing where the inert gas is introduced, under mechanical stirring, into the liquid phase comprising the resin, hardener, microballoons and optional additives to obtain a foamed froth-forming composition containing therein the inert gas substantially homogeneously distributed.

The amount of the inert gas introduced into the foamed resin-forming composition may be varied, particularly by use of a flow meter, according to the desired properties of the final product. In general, suitable amounts include about 10% to about 70% by volume, preferably about 20% to about 60% by volume. The bulk density of the resulting cured articles is usually 0.3 to 0.9 g/cm³, preferably 0.4 to 0.8 g/cm³.

Conveniently, separate tanks are filled with the resin and hardener. The application of low pressure to the tanks facilitates pumping of the materials. Gear tanks deliver the resin and hardener from the tanks to the mix block where the resin, hardener and inert gas are mixed under high shear. The compressed air is injected directly into the mix block. A dynamic mixer, with a hose attached thereto, and chamber are attached to the mix block. The amount of compressed air injected into the mix chamber is controlled with a flow meter, which allows for controlled variances in density of the dispensed material. The residence time in the mix block, the high speed of mechanical stirring to dispense the inert gas finely into the mixture and the length of the hose attached to the chamber influence how well the injected air is homogeneously dispersed into the resin and hardener mixture.

The resulting frothed syntactic resin composition containing therein the inert gas is useful as a seamless master modeling paste, which is dispensed onto the substructure. Curing thereof can be carried out as described hereinabove.

Machining or cutting can be carried out using conventional tools or cutting machines, such as milling machines, machining centers and the like, into the desired shape. Of particular interest is the use of a computer numerical control (CNC) machine. The shaped article can be used modeling material, and is useful for the production of master models, design models, tracing models and prototype tools.

From the foregoing description, it is apparent to those skilled in the art that the total fabrication cost of a model using the method of the present invention is more economical than the conventional method of using wood or epoxy synthetic foam model blocks. An additional and important advantage is a resulting model surface that is seamless and free of bond-lines.

This method is further advantageous in that the amount of syntactic material used is greatly reduced over the conventional method since only a thin layer is dispensed onto the substructure surface. Since syntactic materials are inherently hygroscopic, their moisture absorption causes some dimensional change over time. By minimizing the amount of syntactic material used, the dimensional change as the result of moisture absorption is thereby reduced.

In addition to the advantages mentioned above (namely lower and more uniform density, better machinability, smoother surface characteristics, and much greater overall efficiency), the seamless master paste produced in accordance with the present invention exhibits low linear shrinkage and produces even large models that hold high tolerances. The finished article has excellent edge strength, cured shore hardness, flexural strength, heat deflection temperature, compressive strength as well as coefficient of thermal expansion.

The present invention is illustrated by reference to the following Examples, which are not intended to limit the scope of the present invention in any manner whatsoever. All parts and percentages are provided on a weight basis unless indicated otherwise.

Example 1

This example illustrates the preparation of a typical polyurethane seamless master modeling paste of the invention.

The formulation noted in the Table 1 below is prepared by charging the hardener system containing the polyols, microspheres and optional components to a mixing tank and mixing at low speed for 15-30 minutes. A second tank is filled with the isocyanate resin component, and a third tank filled with compressed air is provided. The hardener system and resin component are delivered to a mix block by use of a gear pump, with low pressure (5-10 psi) being applied to the tanks to facilitate pumping of the materials. The compressed air is injected directly into the mix block. In the mix block, the materials and compressed air are homogeneously distributed by using a dynamic mixer under high shear (about 6900 rpm) with a residence time of 2-5 seconds. Residence time is the time in the mixer, which varies inversely with flow rate. For easy control of the density of the dispensed paste, the amount of compressed air injected into the mix chamber is regulated with a flow meter. In this formulation, air reading is 26 ml/min.

The paste is dispensed onto the substructure at a thickness of about one inch and cured at ambient temperature for at least 10 hours. The crude article is shaped to its final contour by use of a Computer Numerical Control (CNC) machine.

The paste is evaluated as follows. The sag resistance of the paste is measured prior to curing by dispensing the paste at a thickness of 0.75 to 1.5 inches horizontally on a vertical surface. A measurement of 0.75-1.5 inch is desirable, and indicates that the material sags or slumps only this much. The density, heat deflection temperature (HDT), 66 psi load and coefficient of thermal expansion (CTE), over −30° C. to +30° C., of the paste are measured at 25° C. after curing at ambient temperature for a minimum of 24 hours. Density is measured in accordance with ASTM D792; HDT, with ASTM D648; and CTE, with ASTM DE831.

TABLE 1

| Formulation 1 | |
|---|---|
| | (pts by weight) |
| Hardener System | |
| Low molecular weight polyol[1] | 21.29 |
| High molecular weight polyol[2] | 34.73 |
| Thermoplastic microspheres[3] | 1.43 |

TABLE 1-continued

Formulation 1

| | (pts by weight) |
|---|---|
| Molecular sieve powder[4] | 4.86 |
| Calcium carbonate | 29.53 |
| Calcium stearate | 2.86 |
| Diethyl toluene diamine | 4.00 |
| Reactive colorants | 0.55 |
| Silicone surfactant[5] | 0.75 |
| Resin | |
| Polymeric MDI[6] | 100.00 |
| Reaction Ratio | 58/100 |
| Properties | |
| Sag Resistance (uncured paste) | 0.75–1.5 inch |
| Density (cured) | 0.56 g/cm$^3$ |
| HDT (cured) | 72° C. |
| CTE (cured) | 54.4 × 10$^{-6}$ in/in/° C. |

[1]Poly-G 37-500, from Arch Chemicals
[2]Poly-G 30-280, from Arch Chemicals
[3]Expancel 551 DE, from Akzo Nobel
[4]Molecular Sieve Type 3A, from UOP
[5]Dabco DC 197 Surfactant, from Air Products
[6]Polymethylene polyphenyl isocyanate, functionality of 2.7 (CAS No. 9016-87-9

The data illustrate the excellent performance characteristics of the pastes prepared in accordance with the present invention. Notably, the paste of the invention gives excellent sag resistance properties.

Comparative Example 1

This example illustrates the preparation of a comparative polyurethane formulation.

The same general procedure of Example 1 is followed, except that the formulation noted in Table 2 below is used. The comparative polyurethane formulation is the same as for Example with the exception that the diethyl toluene diamine is omitted. The properties of the paste so prepared show that this formulation is not suitable for the preparation of a seamless master modeling paste due to the poor dispensing characteristics as indicated by the low resistance to sag of the dispensed paste. Sag resistance is measured as in Example 1.

TABLE 2

Comparative Formulation 1

| | (pts by weight) |
|---|---|
| Hardener System | |
| Low molecular weight polyol[1] | 22.18 |
| High molecular weight polyol[2] | 36.20 |
| Thermoplastic microspheres[3] | 1.49 |
| Molecular sieve powder[4] | 5.06 |
| Calcium carbonate | 30.77 |
| Calcium stearate | 2.98 |
| Diethyl toluene diamine | — |
| Reactive colorants[5] | 0.57 |
| Silicone surfactant[6] | 0.75 |
| Resin | |
| Polymeric MDI[7] | 100.00 |
| Reaction Ratio | 54/100 |
| Properties | |
| Sag Resistance | >1.5 inch* |

*This material exhibits virtually no sag resistance.

Example 2

This example illustrates the preparation of further typical polyurethane seamless master modeling pastes of the invention. The formulations noted in Table 3 below are prepared in the same general manner as in Example 1, with the exception that the amounts of various components are varied. The properties of the paste so prepared show that these formulations are suitable for the preparation of a seamless master modeling paste due to the excellent dispensing characteristics as indicated by the high resistance to sag of the dispensed paste. Sag resistance is measured as in Example 1.

TABLE 3

| | (pts by weight) | |
|---|---|---|
| | Formulation 2 | Formulation 3 |
| Hardener System | | |
| Low molecular weight polyol[1] | 9.21 | 2.78 |
| High molecular weight polyol[2] | 46.61 | 53.04 |
| Thermoplastic microspheres[3] | 1.44 | 1.44 |
| Molecular sieve powder[4] | 4.90 | 4.90 |
| Calcium carbonate | 29.76 | 29.76 |
| Calcium stearate | 2.88 | 2.88 |
| Diethyl toluene diamine | 4.00 | 4.00 |
| Reactive colorants[5] | 0.48 | 0.48 |
| Silicone surfactant[6] | 0.72 | 0.72 |
| Resin | | |
| Polymeric MDI[7] | 100.00 | 100.00 |
| Reaction Ratio | 52/100 | 48/100 |
| Properties | | |
| Sag Resistance | 0.75–1.5 inch | 0.75–1.5 inch |

Example 3

Table 4 below shows the results of a machining test performed on Formulation 1. The machining test is carried out as follows. The percent by weight of dust (i.e., partides of lass than 0.5 mm in size) is measured during the normal CNC machining operation. Several spindles speeds and feed rates are used and the percentage of dust is compared to a commercially available higher density modeling material XD 4503, density of 0.8 g/cc, (epoxy/amine system) available from Vantico Inc.

TABLE 4

| Spindle Speed (rpm)/ Feed Rate (m/mm) | Total Shavings (g) | Particles <0.5 mm | Dust (%) <0.5 mm | Dust (%) <0.5 mm[1] |
|---|---|---|---|---|
| 20 k/2.7 | 2.81 | 0.19 | 6.76 | 9.71 |
| 20 k/1.0 | 2.70 | 0.32 | 11.85 | 9.27 |
| 12.5 k/2.7 | 2.74 | 0.14 | 5.11 | 5.39 |
| 12.5 k/1.0 | 2.59 | 0.19 | 7.34 | 4.55 |
| 7.5 k/2.7 | 2.94 | 0.10 | 3.40 | 1.90 |
| 7.5 k/1.0 | 2.90 | 0.16 | 5.52 | 2.93 |

[1]Comparative percent dust generated by XD 4503

The results of the test show very good machining performance, which is similar to that of XD 4503. Other characteristics observed during machining, such as surface smoothness, edge definition and odor, indicate that the polyurethane formulation prepared in accordance with the present invention has excellent overall machinability.

Example 4

This example shows the ease with which variable density pastes can be produced in a accordance with the invention. The same general procedure of Example 1 is followed, using the components of Formulation 1, except that the amount of air injected into the mix chamber is varied through the use of the flow meter. Table 5 below sets forth the flow of air and the resultant density of the paste so produced. The density is measured as in Example 1.

TABLE 5

| Air reading on the Flow Meter (ml/min.) | Density (g/cm3) |
|---|---|
| 0 | 0.70 |
| 12 | 0.61 |
| 20–21 | 0.57 |
| 26 | 0.55 |
| 27 | 0.53 |
| 28 | 0.50 |
| 29 | 0.46 |

Example 5

The example shows that the exotherm of the system can be controlled by varying the ratio of high molecular weight polyol to low molecular weight polyol while maintaining acceptable chemical thixotropy properties. Table 6 below sets forth the peak exotherm of formulations 1-3. The peak exotherm is measured during reaction of the resin and hardener components.

TABLE 6

| Formulation No.[1] | Peak Exotherm (° C.) | Is Chemical Thixotropy Apparent? |
|---|---|---|
| 1 | 123.7 | YES |
| 2 | 114.5 | YES |
| 3 | 106.1 | YES |

[1]Formulations Nos. 1, 2 and 3 have a ratio of high to low molecular weight polyol of 62:38; 83.5:16.6; and 95:5, respectively.

Example 6

Table 7 below shows the use of various isocyanates in combination with the hardener system of Examples 1 and 3. The same general procedure of Example 1 is followed to produce the pastes. The data show that the use of different isocyanates allows for control of the peak exotherm of the resin/hardener reaction while maintaining good chemical thixotropy.

TABLE 7

| Resin | NCO Content | Hardener System | Reaction Ratio (R/H by wt) | Peak Exotherm | Chemical Thixotropy |
|---|---|---|---|---|---|
| Polymeric MDI | 31.5% | 1 | 58/100 | 123.7° C. | YES |
| Prepolymer 1[1] | 17.8% | 1 | 102/100 | 104.8° C. | YES |
| Prepolymer 2[1] | 18.3% | 1 | 100/100 | 88.4° C. | YES |
| Prepolymer 3[1] | 14.4% | 1 | 128/100 | 78.5° C. | YES |
| Prepolymer 4[1] | 11.4% | 1 | 161/100 | 68.7° C. | YES |
| Polymeric MDI | 31.5% | 3 | 48/100 | 106.1° C. | YES |
| Prepolymer 1 | 17.8% | 3 | 84/100 | 78.3° C. | YES |
| Prepolymer 3 | 14.4% | 3 | 106/100 | 72.2° C. | YES |

[1]The prepolymers are made using Isonate 143L (modified MDI), available from Dow, and Arcol 24–32 Polyol, available from Bayer. The NCO content is varied by blending the prepolymer at various ratios with other isocyanates.

Example 7

The following materials are formulated for their non-slumping properties following mixing and prior to the cure, and their ability to retain air once dispersed into it.

| | pts by weight |
|---|---|
| Resin System | |
| Epoxy resin blend | 40–60 |
| Non-reactive diluents | 5–10 |
| Silicone surfactant | 0.01–0.5 |
| Calcium stearate | 0–10 |
| Non-reactive colorants | 0–5 |
| Alumina trihydrate | 20–40 |
| Thixotropic agent | 0–10 |
| Hardener System | |
| Aliphatic polyamine | 0–15 |
| Amine/epoxy resin adduct | 10–20 |
| Low molecular weight polyol | 10–30 |
| Non-reactive diluents | 0–10 |
| Polyethyleneimine | 0–5 |
| Alumina trihydrate | 20–40 |
| Silicone surfactant | 0.01–0.5 |
| Thixotropic agent | 0–10 |

Reaction ratio Resin:Hardener is 100:90 parts by weight
Density of resin: 1.4 g/cm$^3$
Density of hardener 1.3 g/cm$^3$ The pre-prepared and packed materials are loaded into a 2KM 1900 meter-mix dispensing machine in 50 liter steel drums. The resin and hardener components are delivered to a mixing block by use of pumps at low pressures (5-20 bar) giving a material flow rate of about 100 g/min. Air from a compressed air line is fed directly into the mixing block. The rotary mixer in the block is variable in speed to give the desired frothing effect on resin, hardener and air components together. The compressed air is regulated using a flow meter and the speed of the rotary mixer controlled via the meter-mix machine.

In this example the following parameters are used:
Air flow: 4 bar
Material pressure A: 16 bar
Material pressure B: 5 bar
Flow rate: 100 g/min
Mixer speed: 1400 rpm The paste is extruded onto a solid substrate covered with a release paper and cured at ambient temperature for at least 10 hours.

The material is evaluated as follows. The density is measured using a specific gravity cup (pyknometer). The uncured material from the machine is measured at a density of 0.67 g/cm$^3$ showing the successful incorporation of air into the mixed material. On visual inspection of a cut through the material it can be seen that there was good uniform dispersion of the air within the sample. The cell size is uniform.

What is claimed is:

1. A method of making a seamless model free of bond lines comprising the sequential steps of:
    providing a substructure having an exposed outer surface, the substructure forming part of the seamless model;
    providing separate tanks filled with a resin and a hardener system;
    delivering the resin and hardener system from the tanks to a mix block where the resin, hardener system and inert gas are mixed under high shear to produce a modeling paste of uniform density;
    applying the modeling paste to the outer surface of the substructure in the form of a continuous layer;
    curing the continuous layer of applied modeling paste in situ on the substructure at room temperature; and
    machining said cured layer of modeling paste in situ on the substructure to the desired contour.

2. A method according to claim 1, wherein the modeling paste comprises
    (A)(1) an organic polyisocyanate component;
        (2) a polyol component comprising:
            (a) greater than 60%, by weight of a high molecular weight polyol; and
            (b) less than 40%, by weight, of a low molecular weight polyol, based on the total weight of the combined polyol component; and
        (3) a chemical thixotropic agent in an amount sufficient to induce thixotropic properties; or
    (B)(1) an epoxy resin;
        (2) a thixotropic agent in an amount sufficient to induce thixotropic properties; and
        (3) a hardener comprising:
            (a) at least one polyethyleneimine; and
            (b) at least one other amine having at least two amino hydrogen groups, the combined amounts of (a) and (b) being sufficient to effect cure of the epoxy resin; and
    (C) microballoons in an amount sufficient to produce the modeling paste of uniform density.

3. A method according to claim 2, wherein the organic polyisocyanate (A)(1) is polymethylene polyphenyl isocyanate, 4,4-diphenylmethane diisocyanate, hexamethylene diisocyanate, isophorone diisocyanate, or 2,2,4-trimethylhexamethylene diisocyanate, or mixtures thereof.

4. A method according to claim 2, wherein the organic polyisocyanate (A)(1) is polymeric 4,4'-diphenylmethane diisocyanate (polymeric MDI).

5. A method according to claim 2, wherein the high molecular weight polyol (A)(2)(a) is polyether triol.

6. A method according to claim 2, wherein the low molecular weight polyol is (A)(2)(b) is an amine-based polyol.

7. A method according to claim 2, wherein the low molecular weight polyol (A)(2)(b) is an amine-based trial.

8. A method according to claim 2, wherein the amount of the chemical thixotropic agent (A)(3) is sufficient to prevent flow of the composition when applied to a vertical surface for at least 60 minutes after formation thereof.

9. A method according to claim 2, wherein the amount of the chemical thixotropic agent (A)(3) is sufficient to prevent flow of the composition when applied to a vertical surface prior to gelation.

10. A method according to claim 2, wherein the chemical thixotropic agent (A)(3) is an aliphatic, cycloaliphatic, aromatic, araliphatic or heterocyclic amine.

11. A method according to claim 2, wherein the chemical thixotropic agent (A)(3) is 4,4'-methylenebis(2-ethylbenzeneamine), isophoronediamine or diethyltoluendiamine.

12. A method according to claim 2, wherein the chemical thixotropic agent (A)(3) is diethyltoluenediamine.

13. A method according to claim 2, wherein the microballoons are present in an amount of 0.5 to 5 parts by weight, per 100 parts of component (A)(1) or component (B)(1).

14. A method according to claim 2, wherein the microballoons are present in an amount of 1 to 3 parts by weight, per 100 parts of component (A)(1) or component (B)(1).

15. A method according to claim 2, wherein the polyol component (A)(2) is present in an amount of 4-100 parts by weight; the chemical thixotropic agent (A)(3) is present in an amount of 1 to 10 parts by weight; and the microballoons are present in an amount of 0.5 to 5 parts by weight, all parts by weight being based on 100 parts of the organic polyisocyanate component (A)(1).

16. A method according to claim 2, wherein the epoxy resin (B)(1) is a polyglycidyl ether of a polyhydric alcohol or polyhydric phenol.

17. A method according to claim 2, wherein the thixotropic agent (B)(2) is a hydrophilic fumed silica.

18. A method according to claim 2, wherein the thixotropic agent (B)(2) is present in an amount of 1 to 20% by weight, based on the weight of epoxy resin (B)(1).

19. A method according to claim 18, in which said amount is 3 to 15% by weight.

20. A method according to claim 2, wherein the polyethyleneimine (B)(3)(a) has a molecular weight of 700 to 1,000,000.

21. A method according to claim 20, wherein the polyethyleneimine (B)(3)(a) has a molecular weight of about 750,000.

22. A method according to claim 2, in which the amount of polyethyleneimine (B)(3)(a) is sufficient to prevent flow of the composition when applied to a vertical surface for at least 60 minutes after formation thereof.

23. A method according to claim 2, in which the amount of polyethyleneimine (B)(3)(a) is sufficient to prevent flow of the composition when applied to a vertical surface prior to gelation thereof.

24. A method according to claim 2, in which the amount of polyethyleneimine (B)(3)(a) is 0.2 to 2 parts by weight, per 100 parts by weight of the epoxy resin (B)(1).

25. A method according to claim 2, in which the other amine (B)(3)(b) is an aliphatic amine.

26. A method according to claim 25, in which the other amine (B)(3)(b) is an N-hydroxyalkyl derivative of a polyalkylene polyamine or a mixture thereof with a polyaminoamide reaction product of a polyalkylene polyamine and a polymerized vegetable oil acid.

27. A method according to claim 1, wherein the modeling paste additionally comprises a filler.

28. A method according to claim 27, wherein the filler is calcium carbonate.

29. A method according to claim 1, wherein the modeling paste additionally comprises molecular sieves.

30. A method according to claim 1, wherein the modeling paste additionally comprises a surfactant or antifoaming agent.

31. A method according to claim 1, wherein the modeling paste additionally comprises calcium stearate.

* * * * *